US010553326B2

(12) United States Patent
Cola et al.

(10) Patent No.: US 10,553,326 B2
(45) Date of Patent: Feb. 4, 2020

(54) CARBON NANOTUBE COMPOSITIONS

(71) Applicant: Georgia Tech Research Corporation, Atlanta, GA (US)

(72) Inventors: Baratunde Cola, Atlanta, GA (US); Daron Spence, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/325,222

(22) PCT Filed: Jul. 10, 2015

(86) PCT No.: PCT/US2015/040000
§ 371 (c)(1),
(2) Date: Jan. 10, 2017

(87) PCT Pub. No.: WO2016/007889
PCT Pub. Date: Jan. 14, 2016

(65) Prior Publication Data
US 2017/0190579 A1    Jul. 6, 2017

Related U.S. Application Data

(60) Provisional application No. 62/022,735, filed on Jul. 10, 2014.

(51) Int. Cl.
*B22F 3/00* (2006.01)
*H01B 1/02* (2006.01)
(Continued)

(52) U.S. Cl.
CPC ............... *H01B 1/02* (2013.01); *B82Y 30/00* (2013.01); *H01B 1/04* (2013.01); *B82Y 40/00* (2013.01);
(Continued)

(58) Field of Classification Search
None
See application file for complete search history.

(56) References Cited

U.S. PATENT DOCUMENTS 7,803,262 B2 *   9/2010   Haik ...................... B29C 67/24
                                                            204/557
2003/0044608 A1   3/2003   Yoshizawa
(Continued)

FOREIGN PATENT DOCUMENTS

CN       103586464    *   2/2014   ............... B22F 1/00
EP       1923476          5/2008
(Continued)

OTHER PUBLICATIONS

Daoush et al., "Electrical and mechanical properties of carbon nanotube reinforced copper nanocomposites fabricated by electroless deposition process", 2009, Materials Science and Engineering A, vol. 513-514, pp. 247-253.*
(Continued)

*Primary Examiner* — Seth Dumbris
(74) *Attorney, Agent, or Firm* — Pabst Patent Group LLP

(57) ABSTRACT

Metal-carbon nanotube composites having nanotubes which are uniformly dispersed within the metal matrix of the composite, and which are unbundled or substantially unbundled, have high lengths, and which can be controllably aligned are disclosed herein. Such metal-carbon nanotube composites can show improved electrical, thermal, and mechanical properties, as compared to a pristine metal or metal alloy which does not contain nanotubes dispersed therein. Facile and scalable methods of fabricating such metal-nanocarbon composites are also disclosed.

31 Claims, 6 Drawing Sheets

(51) Int. Cl.
    *B82Y 30/00*    (2011.01)
    *H01B 1/04*    (2006.01)
    *B82Y 40/00*    (2011.01)
(52) U.S. Cl.
    CPC ...... *C01B 2202/08* (2013.01); *C01B 2202/22* (2013.01); *C01B 2202/24* (2013.01); *C01B 2202/34* (2013.01); *Y10S 977/742* (2013.01); *Y10S 977/784* (2013.01); *Y10S 977/847* (2013.01); *Y10S 977/932* (2013.01); *Y10T 428/12049* (2015.01)

(56)            References Cited

U.S. PATENT DOCUMENTS

| | | | |
|---|---|---|---|
| 2005/0116336 A1* | 6/2005 | Chopra | B82Y 10/00 257/720 |
| 2006/0062985 A1* | 3/2006 | Karandikar | B82Y 30/00 428/292.1 |
| 2006/0228288 A1 | 10/2006 | Chow | |
| 2008/0179104 A1* | 7/2008 | Zhang | B22F 1/0025 175/374 |
| 2011/0311427 A1 | 12/2011 | Hauge | |
| 2013/0053471 A1* | 2/2013 | Studart | B29C 67/24 523/115 |
| 2014/0212640 A1* | 7/2014 | Piazza | C01B 31/0253 428/206 |

FOREIGN PATENT DOCUMENTS

| | | | | |
|---|---|---|---|---|
| KR | 1020130108890 | * | 2/2014 | B82B 3/00 |
| WO | WO-2014182645 A1 | * | 11/2014 | C22C 26/00 |

OTHER PUBLICATIONS

Koppad et al., "On shear-lag and thermal mismatch model in multiwalled carbon nanotube/copper matrix nanoconnposites", Sep. 2012, Journal of Alloys and Compounds, vol. 549, pp. 82-87.*
Maqbool et al., "Mechanical characterization of copper coated carbon nanotube reinforced aluminum matrix composites", Sep. 2013, Materials Characterization, vol. 86, pp. 39-48.*
Bakshi, et al., "Carbon nanotube reinforced metal matrix composites—a review", Intl Materials Reviews, 55(1), 41-64 (2010).
International Search Report for corresponding PCT application PCT/US2015/040000 dated Oct. 15, 2015.

* cited by examiner

CARBON NANOTUBE COMPOSITIONS

CROSS-REFERENCE TO RELATED APPLICATIONS

This application is a 371 application of International Application No. PCT/US2015/040000, filed Jul. 10, 2015, which claims priority to U.S. Ser. No. 62/022,735 entitled "Method to Disperse Carbon Nanotubes in a Metal Melt", filed on Jul. 10, 2014, the disclosures of which are hereby incorporated herein by reference in their entirety.

FIELD OF THE INVENTION

This invention is in the field of carbon nanotube composite metal feedstocks, foils, substrates, wires, and methods of making and using thereof.

BACKGROUND OF THE INVENTION

Metals and metal alloys have to-date shown limitations in providing both strength and stiffness leading to the development of metal matrix composites (MMCs). Such MMCs can be designed to possess improved qualities such as a low coefficient of thermal expansion and high thermal conductivity which make them suitable for various commercial applications.

Carbon nanotubes (CNTs), for example, have been the focus of a few studies for reinforcement of MMCs. The limited examples of CNT-reinforced MMCs are summarized in a review article by Bakshi, et al. International Materials Reviews, 2010, 55(1), 41-64.

Nevertheless, several challenges remain in fabricating such metal-carbon nanotube composites. For example it is difficult to produce MMCs that have CNTs uniformly dispersed throughout the metal matrix. There are also challenges in the ability to form composites containing uniformly dispersed CNTs in the metal matrix and wherein the CNTs are substantially unbundled, have high lengths, and which can be controllably aligned along an axis of the composite.

Thus, there exists a need for metal-carbon nanotube composites having improved properties.

Therefore, it is an object of the invention metal-carbon nanotube composites wherein the electrical, thermal, and mechanical properties of carbon nanotube structures dispersed within the composite are retained.

It is a further object of the invention to provide facile and scalable methods of producing such metal-nanocarbon composites.

SUMMARY OF THE INVENTION

Metal-carbon nanostructure composites, methods of making, and uses thereof are described herein. The metal-carbon nanostructure composites described herein contain a plurality of tubular-shaped carbon nanostructures dispersed therein. In certain embodiments, the metal matrix forming the composites is a metal or metal alloy wherein the metal is selected from, but not limited to, aluminum, copper, cobalt, chromium, zinc, tantalum, platinum, gold, nickel, iron, tin, lead, silver, titanium, indium, combinations thereof and/or one or more metal oxides, such as oxides of the metals listed above.

Another embodiment provides at least one of the carbon nanostructures dispersed in the metal or metal alloy matrix of the composite has a length of such other carbon nanostructures can range from 0.01 to 5,000 microns, preferably 0.1 to 2500 microns, preferably 0.1 to 2000 microns, more preferably 0.1 to 1000 microns. The length of at least one of the CNTs forming the plurality of CNTs can be in the range of 100-1000 microns.

The composites contain carbon nanostructures, such as CNTs, which are aligned along a plane of the metal-carbon composite formed and dispersed throughout the composite. In certain embodiments, the CNTs can be controllably aligned along the in-plane direction. In certain other embodiments, the CNTs can be controllably aligned along the cross-plane direction. In certain other embodiments, the CNTs can be controllably aligned along an intermediate-plane direction.

The metal-carbon nanostructure composites described herein can have thermal or electrical conductivities which are at least equivalent to that of a pristine metal or metal alloy containing no carbon nanostructures dispersed therein.

Other embodiments provide metal-carbon nanostructure composites having electrical conductivities which are at least 100% or higher than of a pristine metal or metal alloy. The electrical conductivities of the composites can be up to about 105%, 110%, 115%, 120%, 125%, 130%, 135%, 140%, 145%, 150%, or higher than the pristine metal or metal alloy. In certain aspects the specific conductivities of the metal-carbon nanostructure composites are about 150%, 175%, 200%, or higher than that of the pristine metal which contains no carbon nanostructures.

Still other embodiments provide metal-carbon nanostructure composites that have thermal conductivities which are at least 100% or higher than of a pristine metal or metal alloy. The thermal conductivities of the composites are increased in an in-plane or cross-plane direction by greater than about 20%, 30%, 40%, 50%, 60%, 70%, or 80%, versus that of an equivalent pristine metal or metal alloy.

In some embodiments, the metal-carbon nanostructure composites described herein have thermal resistances of less than 5 mm$^2$ K/W, more preferably less than 1 mm$^2$ K/W.

In certain embodiments, the metal-carbon nanostructure composites described herein have coefficients of thermal expansion which are about 50, 40, 30, 20, or 10% of the values for an equivalent pristine metal or metal alloy. In certain embodiments the coefficients of thermal expansion are of a similar value to those of silicon, silicon carbide, or other semiconductor material(s).

In certain other embodiments, the metal-carbon nanostructure composites described herein have mechanical properties which are distinct from that of a pristine metal or metal alloy containing no carbon nanostructures dispersed therein. In some embodiments, the tensile modulus of the metal-carbon nanostructure composites is in the range of about 0.1 to about 10 GPa. In some embodiments, the tensile modulus of the metal-carbon nanostructure composites is about 30, 40, 50, 60, 70, 80, 90, or 100% of the value of the pristine metal or metal alloy.

In certain embodiments, methods of forming the composites described herein include forming vertically aligned carbon nanotube arrays, Which are supported on, or, alternatively, attached to, the surface of support or substrate, formed at least in part from a metal. In other embodiments, support materials can be, but are not limited to, ceramics and silicon or silicon compounds, such as silicon dioxide. In certain other embodiments, the substrate or support is a metallic foil, such, but not limited to, aluminum foil or copper foil.

In certain embodiments, the carbon nanostructures, which are dispersed in the metal-carbon nanostructure composites, are conformally coated with a nanoscale coating formed of, but not limited to, a metal, metal oxide, or carbonaceous material. Without wishing to be bound to any particular theory, such coating(s) can improve the wettability and/or dispersibility of the carbon nanostructures to a liquid/molten metal or metal alloy. In some embodiments, the metal can be, but is not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above.

In preferred embodiments, the CNTs are conformally coated at the sidewalls of the CNTs and optionally at the tips of the CNTs. In certain embodiments, at least 100%, 99%, 98%, 97%, 96%, 95%, 90%, 80%, 70%, 60%, or 50% of the CNTs are coated.

In certain non-limiting embodiments, a method of making a metal-carbon composite, as described herein, includes the steps of:

1) preparing a carbon nanotube array on a substrate or support.

2) conformally coating the carbon nanotubes on the substrate with one or more coating materials in an amount effective to improve the wettability and/or dispersibility of the carbon nanotubes in a metal or metal matrix;

3) adding the conformally coated carbon nanotubes on the substrate to a melt of metal or metal alloy; and 4) cooling the mixture in order to form a metal-carbon nanotube composite, wherein the carbon nanotubes are uniformly dispersed within the composite.

In certain embodiments, the substrate is formed of metal which is different from the metal used to form the melt. The use of different metals permits for formation of a metal alloy of the two metals in the composite having carbon nanotubes dispersed therein. In some embodiments, the melt may include one or more metals, which are different from the metal forming the substrate.

In certain other embodiments, the substrate is formed of material which is resistant to high temperatures and can be recovered after addition to the melt and reused according to the method described. In some embodiments, the reusable substrate having an array formed on one or both sides can be dipped into the melt of metal or metal alloy in a controlled manner in order to release the CNTs from the substrate into the molten metal. Exemplary materials from which high temperature resistant substrates can be formed include, but are not limited to, titanium, tungsten, ceramics and silicon-based materials. In some embodiments, the substrate melts at a higher temperature than the temperature of the melt of the metal or metal alloy melt in order to keep the substrate intact and the array of carbon nanotubes in their original orientation after the liquid metal or metal alloy of the melt infiltrates the CNTs of the array and solidifies.

In certain embodiments, the metal-carbon nanostructure composites described herein, may be prepared by casting the mixture as a sheet, plate, foil, rod, wire, strip, ingot, pellet, or chunk. In certain embodiments, such composites are formed by placing a carbon nanostructure array formed on a substrate or support, as described above, into a suitable mold which is then heated by itself or concurrently with another pure metal at a temperature above the melting temperature of the other metal in order to form or cast a composite in the form of the mold.

In some non-limiting examples, it is possible to sandwich or stack one or more of the conformally coated carbon nanostructure arrays, which are formed on a substrate or support, into a suitable mold and heat to a temperature above the melting temperature of the metal substrate and optionally apply pressure to form or cast the composite. In another non-limiting example, it is possible to sandwich or stack one or more of the conformally coated carbon nanostructure arrays, which are formed on a substrate or support, into a mold and add another pure metal or metal alloy during heating at a temperature above the melting temperature of the metal(s) or metal alloy(s) and optionally apply pressure to form or cast a composite. Such processes are illustrated in FIGS. 2-5. In certain embodiments, the sandwich or stack of one or more of the carbon nanostructure arrays, which are formed on a substrate or support may be the same or may differ from one another, such as for example, in the length or density of the CNTs, or in the type of conformal coating(s) applied, as needed.

Such processes can take advantage of numerous types of molds. In some other embodiments, such processes allow for selective orientation of the carbon nanostructure array formed on a substrate or support in order to manipulate the flow of the molten metals with respect to the alignment of the CNTs. The mold can be modified to encompass designs that may be used for creating various types of bulk metal-carbon composites. Such bulk composites can be formed into shapes which include, but are not limited, to rods or plates. In certain embodiments, the casting processes described can further include the placement of weighted pieces or articles on the top, bottom, or other plane of a mold, or these may inserted into the mold in order to exert control of a parameter, such as, for example, densification of the composite, as shown in FIG. 5.

Without limitation, the metal-carbon nanostructure composites described herein can be used as feedstock materials which can be used in a continuous casting or melt extrusion process.

In certain embodiments, the metal-carbon nanostructure composites described herein can be added to a melt of a metal or metal alloy and cast and formed into sheets, plates, foils, rods, wires, strips, ingots, pellets, or chunks which can be subsequently added to another metal or metal alloy melt.

In certain embodiments, the metal-carbon nanostructure composites described herein, can be heated by itself or concurrently with pure metal or metal alloy above the melting temperature to form or cast a composite in a suitable form such as a sheet, plate, foil, rod, wire, strip, ingot, pellet, or chunk.

In certain embodiments, the metal-carbon nanostructure composites described may be placed or affixed in between a heat source and a heat sink or heat spreader, such as between an integrated circuit package and a heat exchanger, to improve the transfer of heat from the heat source to the heat sink or spreader. In certain other embodiments, metal or metal alloys, which are prepared by mixing the composites into the respective melts of metal or metal alloys and can be used in the same manner.

In certain embodiments, the metal-carbon nanostructure containing composites described herein can be used as thermal interface materials (TIMs) in personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs. In certain embodiments, the TIMs can operate at temperatures up to about 200° C.

In certain other embodiments, the metal-carbon nanostructure containing composites can alternatively be used for applications other than heat transfer. Examples include, but are not limited to, microelectronics, through-wafer vertical interconnect assemblies, and electrodes for batteries and capacitors. Currently, copper and aluminum foil are used as the backing materials for the anode and cathode in lithium ion batteries.

In yet other embodiments, the metal-carbon nanostructure containing composites can also be used for electromagnetic shielding, wherein the CNTs can act to effectively absorb electromagnetic irradiation as well as solar absorbing material, to enhance solar absorption in solar hot water heaters. In other embodiments, the composites described can be used in applications including, but not limited to, armored reinforcements, forming structural frames, cast or extruded to form molded heat sinks and heat spreaders, such as for mobile electronics, aerospace and automotive brakes, gears and frames. In some embodiments, the metal-carbon nanostructure composite can be placed at an interface between a heat sink and a chip (such as an electronic or computer chip) and the composite has a thermal resistance of less than 1 mm² K/W.

BRIEF DESCRIPTION OF THE DRAWINGS

In FIG. 2A, a vertically aligned array formed on a metal substrate is placed in the mold and a second metal or metal alloy can optionally be added (not shown). As shown in FIG. 2B, following heating and the optional application of pressure a metal-carbon nanostructure composite is formed.

In FIG. 3A, a vertically aligned array formed on a metal substrate is placed in the mold and a second metal or metal alloy can optionally be added (not shown). As shown in FIG. 3B, following heating and the optional application of pressure a metal-carbon nanostructure composite is formed.

In FIG. 4A, two or more vertically aligned arrays formed on metal substrates are placed in a mold and a second metal or metal alloy can optionally be added (not shown). As shown in FIG. 4B, following heating and the optional application of pressure a metal-carbon nanostructure composite is formed.

In FIG. 5A, two or more vertically aligned arrays formed on metal substrates are placed in a mold and a second metal or metal alloy can optionally be added (not shown). As shown in FIG. 5B, following heating and the optional application of pressure a metal-carbon nanostructure composite is formed.

DETAILED DESCRIPTION OF THE INVENTION

Figures 1A, 1B, 1C:
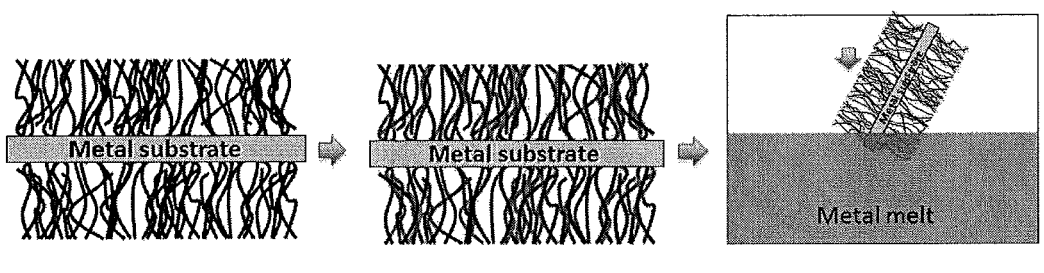
FIGS. 1A-1E show a non-limiting illustration of the method of preparing a metal-carbon nanostructure composite described herein wherein a vertically aligned nanotube array is formed on a substrate, as shown in FIG. 1A, followed by conformal coating of the nanotubes to enhance wetting to a metal melt, as shown in FIG. 1B, adding the array to a metal melt such that the metal fills the array, which can optionally melt the substrate, as shown in FIG. 1C, such that the nanotubes are dispersed in the melt, as shown in FIG. 1D, in order to form a metal-carbon nanostructure composite, as shown in FIG. 1E.

Metal-carbon nanotube composites and methods of making thereof are described herein.

I. Definitions

"Substrate" or "support", as used herein, refers to the material on which the nanotubes are grown. A variety of materials can serve as a support. Generally, the support is inert, meaning that the support does not chemically participate in the formation of nanotubes on the multilayer substrate. In some embodiment, the support is formed at least in part from a metal including, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above.

"Conformal," or "Conformally Coated," as used herein means covering a surface topography of an object such that it is completely or effectively covered and the covered surface is free or substantially free of pin holes or other defects which expose the underlying material of the object.

"Carbon Nanotube Array" or "CNT array" or "CNT forest", as used herein, refers to a plurality of carbon nanotubes which are vertically aligned on a surface of a material, such as a substrate or support. Carbon nanotubes are said to be "vertically aligned" when they are substantially perpendicular to the surface on which they are supported or attached. Nanotubes are said to be substantially perpendicular when they are oriented on average within 30, 25, 20, 15, 10, or 5 degrees of the surface normal.

"Polymer coating" as used herein, generally refers to polymers or molecules that bond to CNTs through van der Waals bonds, π-π stacking, mechanical wrapping and/or covalent bonds and bond to metal, metal oxide, or semiconductor material surfaces through van der Waals bonds, π-π stacking, and/or covalent bonds.

"Thermal Interface Material" (TIM), as used herein, refers to a material or combination of materials that provide high thermal conductance and mechanical compliance between a heat source and heat sink or spreader to effectively conduct heat away from a heat source.

"Contact angle", as used herein, refers to the angle of incidence of a water droplet in air (i.e., a liquid/vapor interface) on the surface of a solid material wherein the angle is measured through the liquid. In one embodiment, the water contact angle (CA) can be measured with a goniometer.

"Coefficient of Thermal Expansion," as used herein, refers to a measure of a change in size, such as volume, per degree of change in temperature at a constant pressure.

"Electrical Conductivity," or "Specific Conductivity," as used herein, refer to the degree that a material can conduct an electric current, as is calculated as the ratio of the current density in the material to the electric field that causes the flow of current. It is the reciprocal of electrical resistivity. Electrical conductivity is typically reported in the SI units of Siemens per meter (S/m).

"Thermal contact resistance," as used herein, refers to when two surfaces are in thermal contact and resistance to heat transfer between the surfaces exists.

"Thermal conductivity," as used herein, refers to the transport of energy in the form of heat through a body of mass as the result of a temperature gradient and is determined as the heat energy transferred per unit of time and per unit of surface area divided by the temperature gradient. Thermal conductivity is typically expressed in units of W $m^{-1} K^{-1}$.

"Tensile modulus," alternatively known as Young's modulus or the modulus of elasticity, as used herein, refers to a measure of the stiffness of a material and is a measure of the ratio of stress along an axis to the strain along the same axis. Tensile modulus can be used to describe the elastic properties of a material or object when stretched or compressed.

"Wettability," as used herein refers to the interaction between a wetting fluid and solid phase, such as a surface and can be further defined by the contact angle of the fluid with the solid phase.

II. Metal-Carbon Nanostructure Composites

A. Metal Substrates/Supports for Vertically Aligned Carbon Nanostructures

A variety of materials can serve as a support or substrate for vertically aligned arrays of tubular shaped nanocarbon materials. In some embodiments, the substrate or support is formed at least in part from a metal, such as, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In other embodiments, materials can be, but are not limited to, ceramics and silicon or silicon compounds, such as silicon dioxide. In certain other embodiments, the substrate or support is a metallic foil, such, but not limited to, aluminum foil or copper foil.

In some embodiments, the surface of the support may be treated to increase adhesion of the carbon nanostructures to be formed via the inclusion of a suitable adhesion layer or surface treatment, which may include the use of plasma-assisted or chemical-based surface cleaning. Other treatments can include the deposition of a metal or metal oxide coating or particles on the support.

The substrate or support, and conditions under which a vertically aligned array of carbon nano structures, such as carbon nanotubes (CNT), are formed, can be selected such that the support resists reacting with the catalyst, process gases, and/or residual gases through reactions, such as oxidation, silicidation, alloying, and/or carbide formation. For example, C, O, H, and N are the elements composing most CNT CVD process and contamination gases. Reaction conditions, such as temperature, can be selected in order to minimize adverse reactions of the support.

B. Vertically Aligned Carbon Nanostructures Forming Arrays

In certain embodiments, the carbon nanostructures form tubular structures which form vertically aligned forests or arrays. In particular embodiments, the vertically aligned carbon nanostructures are single, double, triple, or higher order multi-walled carbon nanotubes with diameters in the range from 10 to 40 nm, more preferably 15 to 30 nm, most preferably about 20 nm or less. The length of such other carbon nanostructures can range from 0.01 to 5,000 microns, preferably 0.1 to 2500 microns, preferably 0.1 to 2000 microns, more preferably 0.1 to 1000 microns.

In other embodiments, the carbon nanostructures can form, but are not limited to, fibers, wires, horns, cones, or other tube-shaped structures which have a high aspect ratio (i.e., greater than 1). The length of such other carbon nanostructures can range from 0.01 to 5,000 microns, preferably 0.1 to 2500 microns, preferably 0.1 to 2000 microns, more preferably 0.1 to 1000 microns.

In preferred embodiments, the vertically aligned carbon nanostructure arrays contain a plurality of carbon nanotubes which are vertically aligned on the surface of a metal or metal containing support or substrate.

In certain embodiments, the CNT arrays are grown on the substrates described via chemical vapor deposition. Other methods of growing vertically aligned CNT arrays are known in the art. Generally, the nanotubes are present at a sufficient density such that the nanotubes are self-supporting and adopt a substantially perpendicular orientation to the surface of the substrate or support. In some embodiments, the nanotubes forming the array are oriented, on average, within 30, 25, 20, 15, 10, or 5 degrees of the surface normal or a line drawn perpendicular to the surface of the substrate or support. Preferably, the nanotubes are spaced at optimal distances from one another and are of uniform height.

In certain embodiments, the carbon nanotube density on the support or substrate surface ranges from about $1 \times 10^7$ to $1 \times 10^{11}$ nanotubes per $mm^2$, more preferably from about $1 \times 10^8$ to $1 \times 10^{10}$ nanotubes per $mm^2$, most preferably from about $1 \times 10^9$ to $1 \times 10^{10}$ nanotubes per $mm^2$.

C. Conformal Coating

In certain embodiments, the carbon nanostructures, which are dispersed in the metal-carbon nanostructure composites are conformally coated with a nanoscale coating formed of, but not limited to, a metal, metal oxide, or carbonaceous material. In some embodiments, the metal can be, but is not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In some embodiments, the carbonaceous coating material can be, but is not limited to, pyrolytic carbon, graphite, and single or multi-layered graphene. In some other embodiments, the conformal coating may be polymer-based coating formed of, but not limited to, one or more polymers selected from conjugated polymers, aromatic polymers, and any polymer that can adhere to CNTs and promotes wetting to liquid metals.

In preferred embodiments, the CNTs are conformally coated at the sidewalls of the CNTs and optionally at the tips of the CNTs. In certain embodiments, at least about 100%, 99%, 98%, 97%, 96%, 95%, 90%, 80%, 70%, 60%, or 50% of the CNT's surface is coated. In certain non-limiting embodiments, the thicknesses of the nanoscale conformal coating can range from 0.1 to 1,000 nanometers, preferably 1 to 500 nanometers, preferably 5 to 250 nanometers, more preferably 5 to 100 nanometers, more preferably 5 to 50 nanometers.

For those embodiments where a polymer-based coating is applied, the polymer can be spray coated or the array of vertically aligned carbon nanostructures can be dipped into a polymer solution. In some embodiments, the coating contains one or more oligomeric materials, polymeric materials, or combinations thereof. The polymer is capable of adhering to CNTs and promotes wetting angles with a liquid/molten metal of less than 90 degrees.

In certain embodiments, metallic and metal oxide thin films can be deposited onto the plurality of nanotubes, forming the CNT arrays, to yield a conformal coating on the CNTs prior to forming the metal-carbon nanostructure composites. Generally, the conformal coating can be applied using any technique known in the art. In some embodiments, the one or more coatings can be applied using atomic layer deposition (ALD). In other embodiments, the metal, metal oxide, or carbonaceous material coating can be vapor deposited onto the carbon nanostructures, such as, via chemical vapor deposition (CVD).

ALD, for example, can be used to deposit the ultrathin films of the desired coating with high conformity and precise control of the thickness. The deposition is controlled at the atomic level by self-limiting surface reactions. Consequently, uniform and conformal deposition will occur on high aspect ratio porous structures because of self-passivating of the surface chemistry. Once the reaction is completed at one surface site, the reactants will continue to travel down the high aspect ratio pore and reach unreacted surface sites.

In certain non-limiting examples, the surface of CNTs is coated via ALD with $Al_2O_3$ on CNTs. In certain embodiments, in order to deposit a high quality conformal and thin coating via ALD, the CNTs can be functionalized in order to optimize uniform nucleation and growth of the oxide throughout the CNT surfaces by the use oxygen plasma with different powers and exposure times. In certain embodiments, wet chemical treatments, such as but not limited to acid treatments may alternatively be used to modify or functionalize the CNTs prior to deposition of the conformal coating. Various types of wet chemical or solution-based treatments for CNTs or other nanocarbon materials are known in the art.

In certain other embodiments, one or more metal or metal oxide nanoparticles may further be applied to the conformally coated CNT array. One or more metal nanoparticles may be adsorbed to the surface and/or distal ends of the coated CNTs. Exemplary metal nanoparticles include, but are not limited to, palladium, gold, silver, titanium, iron, nickel, copper, and combinations thereof. In some embodiments, the metal nanoparticles may be metal oxide type nanoparticles of any suitable metal described herein.

In certain other non-limiting embodiments, the CNTs forming the array may be chemically treated to modify the surface chemistry of the CNTs without the further deposition of any conformal coating(s). Processes for modifying the surface chemistry of CNTs are known in the art and include, but are not limited, to plasma-based treatments with different powers and exposure times, or alternatively, wet or solution-based treatments, such as with acids (such as, for example, sulfuric or nitric acid). In certain other non-limiting embodiments, the CNTs forming the array may be treated with a Pd hexadecanethiolate to deposit Pd nanoparticles on the surface of carbon nanotubes and at defect sites on the nanotubes.

In some embodiments, the conformal coating applied to the array can be used to modify and enhance the wettability and dispersibility of the CNTs when placed in contact with a molten metal or metal alloy. In one non-limiting example, the contact angle (CA) of a wetting fluid on the surface of a conformally coated CNT array produced according to the methods described herein has a CA of about 0° to about 100°. The CA can be controlled as a function of the selection of the conformal coating material and/or thickness of the applied coating. In certain embodiments, a thermal treatment may be applied following the deposition of the conformal coating onto the CNTs of the array.

Without wishing to be bound by any particular theory, modification of the surface chemistry of the carbon nanotubes, such as via deposition of one or more conformal coatings, can allow for better/improved wetting of the metal to the CNTs. In certain other embodiments, such a process improves the wetting and dispersibility of the CNTs to metal alloys. In certain other embodiments, chemical solutions can be applied to the CNTs in order to enhance wettability and dispersibility of the CNT's within the metal matrix.

In certain embodiments, the one or more conformal coatings applied to the CNTs which modify the wetting properties also modify and improve the dispersibility of the CNTs, which form the array, when placed into contact with a molten metal or metal alloy. The modified wetting and dispersibility properties permit CNTs, up to 1000 microns or longer, to be uniformly dispersed within the metal-carbon composite formed. "Uniformly dispersed," as used herein refers to carbon nanostructures which are dispersed within the resulting metal-based composite with a high or substantially high degree of uniformity and homogeneity throughout the entirety of the resulting metal-carbon nanostructure composite. The uniformity and homogeneity of the carbon nanostructures dispersed within the composite can be determined via techniques such as, but not limited to, scanning electron microscopy (SEM), transmission electron microscopy (TEM), x-ray diffraction (XRD), and neutron scattering.

In certain embodiments, the modification of the wettability results in improved dispersibility of the conformally coated carbon nanostructures when placed into a melt of a metal or metal alloy. In some non-limiting embodiments, the conformally coated CNT array is added/mixed into a suitable molten metal or metal alloy in order to form a metal-carbon nanotube composite. In some non-limiting embodiments, the conformally coated CNT array is dipped into a suitable molten metal or metal alloy where the temperature of the melt is less than the melting temperature of the CNT array support to preserve the structure of the support and vertical orientation of the CNT array while filling the void space present between the CNTs in the array with molten metal or metal alloy.

D. Metal-Carbon Nanostructure Composites

The metal-carbon nanostructure composites described herein contain a plurality of tubular-shaped carbon nanostructures dispersed therein. In certain embodiments, the metal matrix forming the composites is a metal or metal alloy wherein the metal is selected from, but not limited to, aluminum, copper, cobalt, chromium, zinc, tantalum, platinum, gold, nickel, iron, tin, lead, silver, titanium, indium, combinations thereof and/or one or more metal oxides, such as oxides of the metals listed above. In some embodiments, the plurality of carbon nanostructures dispersed with a metal or metal alloy matrix are unbundled structures. In some other embodiments, the plurality of nanocarbon structures dispersed with a metal or metal alloy matrix are substantially unbundled structures showing some degree of bundling, typically less than 15%, less than 10%, less than 5%, or less than 1% bundling. "Bundling," as used herein, typically refers to a grouping of at least two or more carbon nanostructures. In some embodiments, the plurality of carbon nanostructures are uniformly dispersed within the metal-carbon composite formed, showing a high or substantially high degree of uniformity and homogeneity throughout the entirety of the resulting metal-carbon nanostructure composite. Methods for characterizing the uniformity of the dispersed carbon nanostructures in the composite include, but are not limited to, scanning electron microscopy (SEM), transmission electron microscopy (TEM), energy dispersive X-ray spectroscopy (EDX), and X-ray photoelectron spectroscopy (XPS).

In certain embodiments, the filling ratio, which is the proportion of uniformly dispersed carbon nanostructures in the composite in weight percent, is in the range of about 0.1 to 90%, 1-80%, 1-70%, 1-60%, 1-50%, 1-40%, 1-30%, 1-20%, and 1-10%.

In some embodiments, at least one of the carbon nanostructures dispersed in the metal or metal alloy matrix of the composite has a length of such other carbon nanostructures can range from 0.01 to 5,000 microns, preferably 0.1 to 2500 microns, preferably 0.1 to 2000 microns, more preferably 0.1 to 1000 microns. In some embodiments, the length of at least one of the CNTs forming the plurality of CNTs is in the range of 100-1000 microns.

In certain embodiments, the metal support or substrate on which the CNT array was formed is the same metal as that forming the metal matrix of the composite. In certain other embodiments, the metal support or substrate on which the array was formed is a different metal than what is used to form the metal forming the matrix in order to form a metal alloy containing the carbon nanostructures dispersed therein.

In some embodiments, the composites formed contain carbon nanostructures dispersed therein, such as CNTs, which are aligned along a plane of the metal-carbon composite formed. In certain embodiments, the CNTs can be controllably aligned along the in-plane direction. In certain other embodiments, the CNTs can be controllably aligned along the cross-plane direction. In certain other embodiments, the CNTs can be controllably aligned along an intermediate-plane direction.

In certain embodiments, the metal-carbon nanostructure composites described herein have thermal or electrical conductivities which are at least equivalent to that of a pristine metal or metal alloy containing no carbon nanostructures dispersed therein.

In certain embodiments, the metal-carbon nanostructure composites described herein have electrical conductivities which are at least 100% or higher than of a pristine metal or metal alloy, which does not contain any carbon nanostructures dispersed therein. In certain embodiments the electrical conductivities are up to about 105%, 110%, 115%, 120%, 125%, 130%, 135%, 140%, 145%, 150%, or higher for the metal-carbon nanostructure-containing composites described herein versus the pristine metal or metal alloy. In certain other embodiments, the specific conductivities of the metal-carbon nanostructure composites are about 150%, 175%, 200%, or higher than that of the pristine metal which contains no carbon nanostructures dispersed therein.

In certain embodiments, the metal-carbon nanostructure composites described herein have thermal conductivities which are at least 100% or higher than of a pristine metal or metal alloy, which does not contain any carbon nanostructures dispersed therein. In certain embodiments the thermal conductivities of the composites are increased in an in-plane or cross-plane direction by greater than about 20%, 30%, 40%, 50%, 60%, 70%, or 80%, versus that of an equivalent pristine metal or metal alloy.

In some embodiments, the metal-carbon nanostructure composites described herein have thermal resistances of less than 5 mm$^2$ K/W, more preferably less than 1 mm$^2$ K/W.

In certain embodiments, the metal-carbon nanostructure composites described herein have coefficients of thermal expansion which are about 50, 40, 30, 20, or 10% of the values for an equivalent pristine metal or metal alloy. In certain embodiments the coefficients of thermal expansion are of a similar value to those of silicon, silicon carbide, or other semiconductor material(s).

In certain other embodiments, the metal-carbon nanostructure composites described herein have mechanical properties which are distinct from that of a pristine metal or metal alloy containing no carbon nanostructures dispersed therein. In some embodiments, the tensile modulus of the metal-carbon nanostructure composites is in the range of about 0.1 to about 10 GPa. In some embodiments, the tensile modulus of the metal-carbon nanostructure composites is about 30, 40, 50, 60, 70, 80, 90, or 100% of the value of the pristine metal or metal alloy.

III. Methods of Preparation of Metal-Carbon Nanostructure Composites

A. Carbon Nanostructure Arrays

In certain embodiments, the carbon nanostructures are tubular structures which form vertically aligned forests or arrays. In particular embodiments, the vertically aligned carbon nanostructures are single, double, triple, or higher order multi-walled carbon nanotubes.

In some embodiments, the vertically aligned carbon nanotube arrays, are supported on, or, alternatively, attached to, the surface of support or substrate, formed at least in part from a metal, such as, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In other embodiments, support materials can be, but are not limited to, ceramics and silicon or silicon compounds, such as silicon dioxide. In certain other embodiments, the substrate or support is a metallic foil, such, but not limited to, aluminum foil or copper foil.

The arrays can be formed via any suitable method known in the art for forming such arrays or forests on a substrate. In preferred embodiments, the array is formed of vertically aligned carbon nanostructures on a support or substrate. The CNTs are said to be "vertically aligned" when they are substantially perpendicular to the surface on which they are supported or attached. Nanotubes are said to be substantially perpendicular when they are oriented on average within 30, 25, 20, 15, 10, or 5 degrees of the surface normal. Preferably, the nanotubes are spaced at optimal distances from one another and are of uniform height. In certain embodiments, the diameters of the CNTs is in the range from 10 to 40 nm, more preferably 15 to 30 nm, most preferably about 20 nm or less. The length of CNTs which form the arrays can range from 0.01 to 5,000 microns, preferably 0.1 to 2500 microns, preferably 0.1 to 2000 microns, more preferably 0.1 to 1000 microns. In other embodiments, the carbon nanostructures form, but are not limited to, fibers, wires, horns, cones, or other tube-shaped structures having a high aspect ratio (i.e., greater than 1) with lengths as described above.

In preferred embodiments, the CNTs are grown at a growth temperature that is less than the melting temperature of the metal or metal alloy substrate or support. In certain embodiments, the CNTs are grown at a growth temperature of between about 600° C. and about 660° C., more preferably between about 610° C. and about 650° C., most preferably between about 620° C. and about 640° C.

Any suitable carbon source gas may be utilized. In some embodiments, the carbon source gas is acetylene. Other suitable carbon source gases include ethene, ethylene, methane, n-hexane, alcohols, xylenes, metal catalyst gases (e.g., carbonyl iron), and combinations thereof.

In certain other embodiments, arrays of vertically aligned CNTs are fabricated on another surface, and can be transferred, using methods known in the art, to a support or substrate made of a metal, metal alloy, ceramic, silicon-based, or other suitable material.

B. Conformal Coating of Carbon Nanostructure Arrays

In certain embodiments, the carbon nanostructures, which are dispersed in the metal-carbon nanostructure composites, are conformally coated with a nanoscale coating formed of, but not limited to, a metal, metal oxide, or carbonaceous material. In some embodiments, the metal can be, but is not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In some embodiments, the carbonaceous coating material can be, but is not limited to, pyrolytic carbon, graphite, and single or multi-layered graphene. In yet some other embodiments, the conformal coating may be polymer-based coating formed of, but not limited, to one or more polymers selected from conjugated polymers, aromatic polymers, or any polymer that can adhere to CNTs and promotes wetting to a liquid/molten metal.

In preferred embodiments, the CNTs are conformally coated at the sidewalls of the CNTs and optionally at the tips of the CNTs. In certain embodiments, at least 100%, 99%, 98%, 97%, 96%, 95%, 90%, 80%, 70%, 60%, or 50% of the CNTs are coated.

For those embodiments where a polymer-based coating is applied, the polymer can be spray coated or the array of vertically aligned carbon nanostructures can be dipped into a polymer solution using techniques known in the art. In some embodiments, the coating contains one or more oligomeric materials, polymeric materials, or combinations thereof. Preferably, the polymer adheres to CNTs and promotes wetting angles with liquid/molten metal of less than 90 degrees.

In certain non-limiting examples, vapor deposition methods are used to deposit one or more conformal coatings on the carbon nanostructures. Generally, gas precursors containing the source material of the coating to be deposited, such as by CVD or ALD are fed into closed chamber containing the array. The chamber can be at atmospheric pressure or at various grades of vacuum. The chamber walls can be hot or a heated stage can be used with cold chamber walls to increase the deposition rate on the target object (i.e., CNTs of the array). Methods of forming thin films via CVD are well known in the art. See, for example, S. A. Campbell, *Science and Engineering of Microelectronic Fabrication*, $2^{nd}$ Edition, Oxford University Press, New York (2001); incorporated herein in its entirety by reference. CVD deposition techniques of metals, such as iron, aluminum, and titanium, as well as CVD deposition of metal oxides, such as aluminum oxide and silicon oxide are known. In certain embodiments, CVD deposition rates can be as low as 1 nm/cycle.

In other embodiments, the one or more coatings can be applied using atomic layer deposition (ALD). ALD, for example, can be used to deposit the ultrathin films of the desired coating with high conformity and precise control of the thickness. In certain embodiments, the nanoscale coating thickness can range from 0.1 to 1,000 nanometers, preferably 1 to 500 nanometers, preferably 5 to 250 nanometers, more preferably 5 to 100 nanometers, more preferably 5 to 50 nanometers. The deposition is controlled at the atomic level by self-limiting surface reactions. Once the reaction is completed at one surface site, the reactants will continue to travel down the high aspect ratio pore and reach unreacted surface sites.

In certain non-limiting examples, the surface of CNTs is coated via ALD with $Al_2O_3$ on CNTs. In certain embodiments, in order to deposit a high quality conformal and thin coating via ALD, the CNTs can be functionalized in order to optimize the uniform nucleation and growth of the oxide throughout the CNT surfaces by the use oxygen plasma with different powers and exposure times. ALD typically includes four steps: 1) precursor exposure, 2) evacuation or purging of the precursors and any by-products from the sample and chamber, 3) exposure of the reactant species, and 4) evacuation or purging of the reactants and byproduct molecules from the chamber. By repeating the surface reactions, oxide (e.g., alumina) growth is extremely linear with the number of cycles. In air, water vapor is adsorbed to most of the surfaces, forming hydroxyl groups. In general, precursors react with the hydroxyl groups, which serve as nucleation sites. The nucleation of ALD is important for continuous and pinhole-free ultrathin films.

In certain embodiments, wet chemical treatments, such as, but not limited to, acid treatments may alternatively be used to modify or functionalize the CNTs prior to deposition of the conformal coating. Various types of wet chemical or solution-based treatments for CNTs or other nanocarbon materials are known in the art.

In certain other embodiments of the methods described, one or more metal or metal oxide nanoparticles may further be applied to the conformally coated CNT array. One or more metal nanoparticles may be adsorbed to the distal ends of the coated CNTs. Metal nanoparticles can be applied to the coated CNT arrays using a variety of methods known in the art. For example, a solution of metal thiolate such as palladium hexadecanethiolate can be sprayed or spin coated onto the distal ends of the CNTs, and the organics can be baked off to leave palladium nanoparticles. In another example, electron-beam or sputter deposition can be used to coat metal nanoparticles or connected "film-like" assemblies of nanoparticles onto the distal ends of the CNTs. Exemplary metal nanoparticles include, but are not limited to, palladium, gold, silver, titanium, iron, nickel, copper, and combinations thereof. In some embodiments, the metal nanoparticles may be metal oxide type nanoparticles of any suitable metal described herein.

In certain other non-limiting embodiments, the CNTs forming the array may be chemically treated to modify the surface chemistry of the CNTs without the further deposition of any conformal coating(s). Processes for modifying the surface chemistry of CNTs are known in the art and include, but are not limited, to plasma-based treatments and wet or solution-based treatments.

In other embodiments, the coating material can be deposited on the CNT array using other deposition techniques known in the art, such as, but not limited to, chemical deposition, aerosol spray coating or deposition, and electrochemical deposition.

1. Polymer Coatings

For those embodiments where a polymer-based coating, the one or more polymers to be coated onto the carbon nanostructures can be dissolved in one or more solvents and spray coated or chemically or electrochemically deposited onto CNT forests or arrays grown on a substrate or support. The coatings can include polymers or molecules which can bond to CNTs through van der Waals bonds, π-π stacking, mechanical wrapping and/or covalent bonds.

Exemplary polymers include, but are not limited to, conjugated polymers, aromatic polymers, or any polymer that can adhere to CNTs and promotes wetting to a liquid/molten metal. In certain embodiments, the polymer may be selected from aromatic and non-aromatic conjugated polymer, such as poly(3,4-3thylenedioxythiophene) poly(styrenesulfonate) (PEDOT:PSS), poly(3,4-3thylenedioxythiophene) (PEDOT), polythiophenes (including alkyl-substituted polythiophenes), polystyrenes, polypyrroles, polyacetylenes, polyanilines, polyfluorenes, polyphenylenes, polypyrenes, polyazulenes, polynaphthalenes, polycarbazoles, polyindoles, polyazepines, poly(3,4-ethylenedioxythiophenes), poly(p-phenyl sulfides), and poly(p-phenylene vinylene), polyacetylenes, and polydiacetylenes. The polymer classes listed above include substituted polymers, wherein the polymer backbone is substituted with one or more functional groups, such as alkyl groups.

For spray coating, coating solutions can be prepared by sonicating or stirring the coating materials for a suitable amount of time in an appropriate solvent. The solvent is typically an organic solvent or solvent and should be a solvent that is easily removed, for example by evaporation at room temperature or elevated temperature. Suitable solvents include, but are not limited to, chloroform. The polymer can also be spray coated in dry form using powders with micron scale particle sizes, i.e., particles with diameters less than 100, 50, 40, 20, 10 micrometers. In this embodiment, the polymer powder would need to be soaked with solvent or heated into a liquid melt to spread the powder particles into a more continuous coating after they are spray deposited.

The thickness of the conformal polymer coatings applied to the CNTs is generally between 1 and 1000 nm, preferably between 1 and 500 nm, more preferably between 1 and 100 nm, most preferably between 1 and 50 nm. In some embodiments, the coating thickness is less than 500, 450, 400, 350, 300, 250, 200, 150, 100, 90, 80, 70, 60, 50, 40, 30, 20 or 10 nm.

Spray coating process restricts the deposition of coating to the CNT tips and limits clumping due to capillary forces associated with the drying of the solvent. Alternative techniques can be used to spray coat the coating materials onto the CNT arrays including techniques more suitable for coating on a commercial scale.

C. Preparation of Metal-Carbon Nanostructure Composites

In certain non-limiting embodiments, a method of making a metal-carbon composite, as described above, includes the steps of:

1) preparing a carbon nanotube array on a substrate or support.

2) conformally coating the carbon nanotubes on the substrate with one or more coating materials in an amount effective to improve the wettability and/or dispersibility of the carbon nanotubes in a metal or metal matrix;

3) adding the conformally coated carbon nanotubes on the substrate to a melt of metal or metal alloy; and 4) cooling the mixture in order to form a metal-carbon nanotube composite, wherein the carbon nanotubes are uniformly dispersed within the composite.

Figures 1D, 1E:
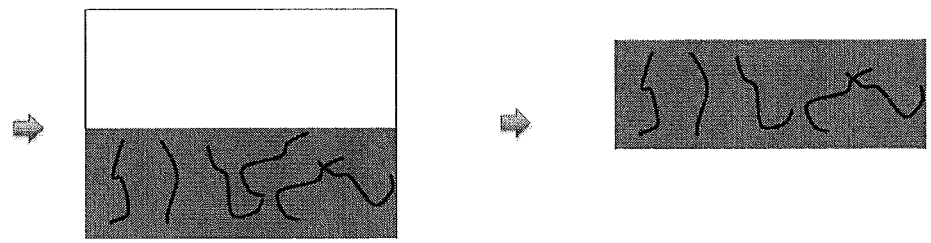
Figures 2A, 2B:
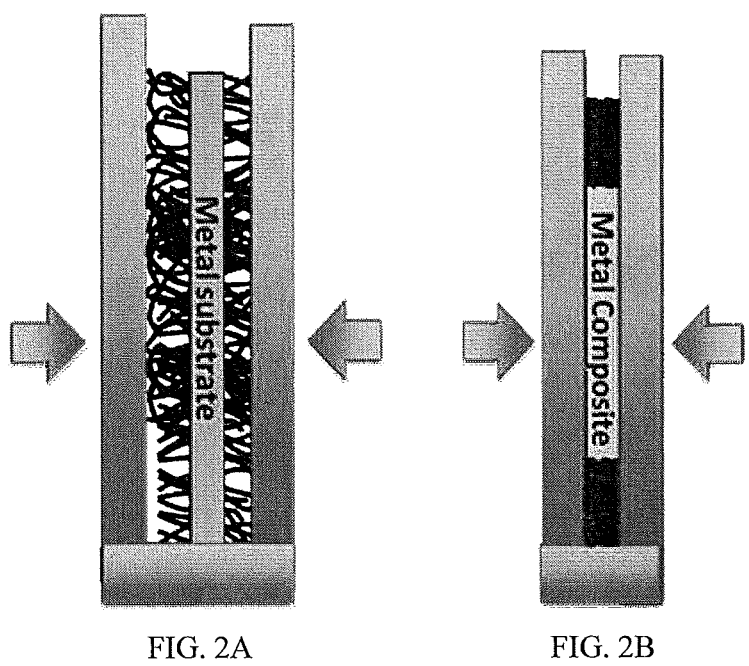
FIGS. 2A and 2B show a non-limiting illustration of a vertical sandwich mold configuration which can be used to form a metal-carbon nanostructure composite.

As shown in FIGS. 1A-1E a non-limiting illustration of the method for preparing a metal-carbon nanostructure composite includes forming a vertically aligned nanotube array is formed on a substrate, as shown in FIG. 1A, followed by conformally coating the nanotubes to enhance wetting and dispersibility to the metal forming a melt, as shown in FIG. 1B, adding the array to the metal melt, such that the metal fills the array, which can optionally melt the substrate, as shown in FIG. 1C, in order for the nanotubes to disperse in the melt, as shown in FIG. 1D, in order to form a metal-carbon nanostructure composite, as shown in FIG. 1E.

In certain embodiments, the substrate or support is formed at least in part from a metal, such as, but not limited to, aluminum, cobalt, chromium, zinc, tantalum, platinum, gold, nickel, iron, tin, lead, silver, titanium, indium, copper, or combinations thereof and/or one or more metal oxides, such as oxides of the metals listed above. In other embodiments, materials can be, but are not limited to, ceramics and silicon or silicon compounds, such as silicon dioxide. In certain other embodiments, the substrate or support is a metallic foil, such, but not limited to, aluminum foil or copper foil.

In some embodiments, the carbon nanotube array is formed on one or both sides of the substrate or support.

In some embodiments, the metal forming the melt can be, but is not limited to, aluminum, copper, cobalt, chromium, zinc, tantalum, platinum, gold, nickel, iron, tin, lead, silver, titanium, indium, combinations thereof and/or one or more metal oxides, such as oxides of the metals listed herein. Generally, the melt may be formed by heating the metal using any suitable method known to a sufficient temperature.

In certain embodiments, the substrate is formed of metal which is different from the metal used to form the melt. The use of different metals permits for formation of a metal alloy of the two metals in the composite having carbon nanotubes dispersed therein. In some embodiments, the melt may include one or more metals, which are different from the metal forming the substrate.

In certain other embodiments, the substrate is formed of material which is resistant to high temperatures and can be recovered after addition to the melt and reused according to the method described. In some embodiments, the reusable substrate having an array forming on one or both sides can be dipped into the melt of metal or metal alloy in a controlled manner in order to release the CNTs from the substrate into the molten metal. Exemplary materials from which high temperature resistant substrates can be formed include, but are not limited to, titanium, tungsten, ceramics and silicon-based materials. In some embodiments, the substrate melts at a higher temperature than the temperature of the melt of the metal or metal alloy melt in order to keep the substrate intact and the array of carbon nanotubes in their original orientation after the liquid metal or metal alloy of the melt infiltrates the CNTs of the array and solidifies.

In some embodiments, after adding the conformally coated carbon nanotubes on the substrate to the melt of metal or metal alloy the mixture is allowed to stand for a period of time in the range of about 0.1-200 minutes, about 15-150 minutes, or about 20-120 minutes. Standing times may be varied as necessary depending on the choice of metal or metal alloy. In some embodiments, the mixture can controllably cooled down to one or more selected temperatures at a suitable cooling rate in the range of about 0.1 to about 50° C. $\min^{-1}$. The cooling time of the mixture will vary depending on the rate of cooling. In some other embodiments, gas, liquid, or flash cooling/rapid quenching techniques, which are known in the art, may be applied to the mixture. Gases such as nitrogen and argon maybe used to cool the mixture and sample holder/mold. In some non-limiting embodiments, quenching the composite in a collection of liquid to induce rapid cooling is can be applied as cooling method. In certain embodiments, after the mixture has cooled and hardened it can be further subjected to an annealing process.

In certain embodiments, during or following addition of the conformally coated carbon nanotubes on the substrate to a melt of a metal or metal alloy, mechanical mixing or agitation may be applied to the mixture to control or improve the uniformity of the CNTs being dispersed throughout the resulting metal-carbon composite. In some embodiments, the application of mechanical mixing or agitation may be used to decrease the time needed to achieve a uniform dispersion of the carbon nanostructures in the melt of the metal or metal alloy.

In certain embodiments, the metal-carbon nanostructure composites described herein, may be prepared by casting the mixture as a sheet, plate, foil, rod, wire, strip, ingot, pellet, or chunk. In certain embodiments, such composites are formed by placing a carbon nanostructure array formed on a substrate or support, as described above, into a suitable mold which is then heated by itself or concurrently with another pure metal at a temperature above the melting temperature of the other metal in order to form or cast a composite in the form of the mold.

Figures 3A, 3B:
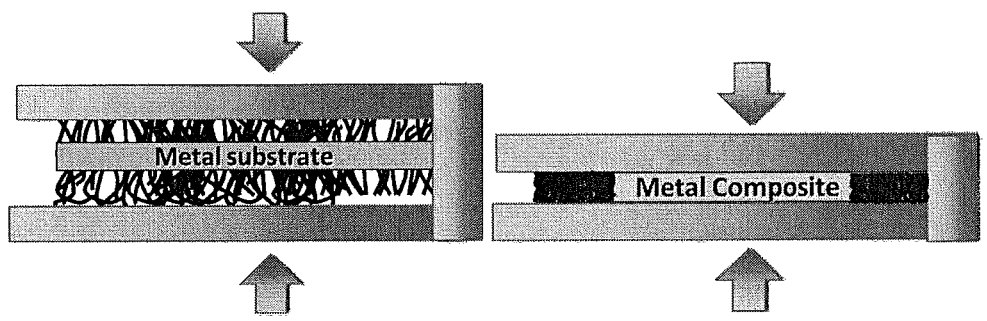
FIGS. 3A and 3B show a non-limiting illustration of a horizontal orientation of a sandwich mold configuration which can be used to form a metal-carbon nanostructure composite.
Figures 4A, 4B:
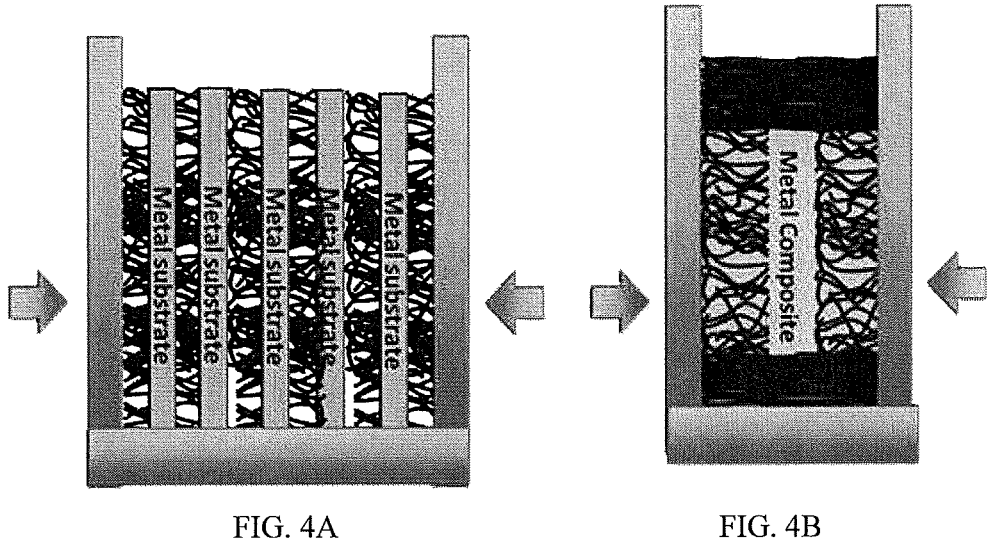
FIGS. 4A and 4B show a non-limiting illustration of a stack configuration which can be used to form a metal-carbon nanostructure composite.
Figures 5A, 5B:
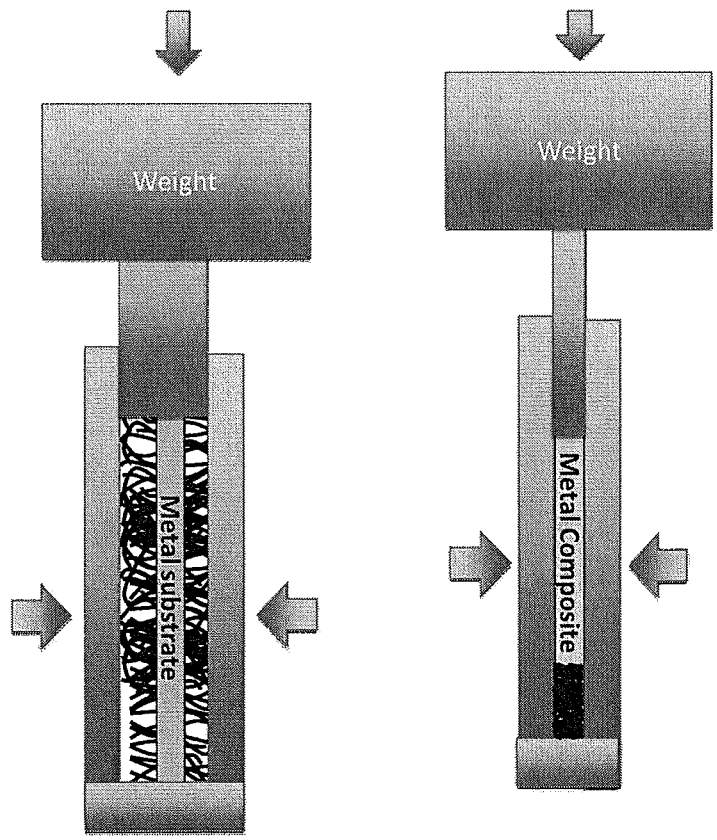
FIGS. 5A and 5B show a non-limiting illustration of a vertical sandwich mold configuration which can be used to form a metal-carbon nanostructure composite which includes one or more weighted tops or inserts in order to densify the composites.

In some non-limiting examples, it is possible to sandwich or stack one or more of the conformally coated carbon nanostructure arrays, which are formed on a substrate or support, into a suitable mold and heat to a temperature above the melting temperature of the metal substrate and optionally apply pressure to form or cast the composite. In another non-limiting example, it is possible to sandwich or stack one or more of the conformally coated carbon nanostructure arrays, which are formed on a substrate or support, into a mold and add another pure metal or metal alloy during heating at a temperature above the melting temperature of the metal(s) or metal alloy(s) and optionally apply pressure to form or cast a composite. Such processes are illustrated in FIGS. 2-5. For example, in FIGS. 2A and 2B a non-limiting illustration of a vertical sandwich mold configuration which can be used to form a metal-carbon nanostructure composite is shown where a vertically aligned array formed on a metal substrate is placed in the mold and a second metal or metal alloy can optionally be added (not shown); see FIG. 2A. Following heating and the optional application of pressure a metal-carbon nanostructure composite is formed); see FIG. 2A. In FIGS. 3A and 3B a non-limiting illustration of a horizontal orientation of a sandwich mold configuration which can be used to form a metal-carbon nanostructure composite is shown. In FIG. 3A, a vertically aligned array formed on a metal substrate is placed in the mold and a second metal or metal alloy can optionally be added (not shown). As shown in FIG. 3B, following heating and the optional application of pressure a metal-carbon nanostructure composite is formed. In FIGS. 4A and 4B a non-limiting illustration of a stack configuration which can be used to form a metal-carbon nanostructure composite is shown. In FIG. 4A, two or more vertically aligned arrays formed on metal substrates are placed in a mold and a second metal or metal alloy can optionally be added (not shown). As shown in FIG. 4B, following heating and the optional application of pressure a metal-carbon nanostructure composite is formed. In FIGS. 5A and 5B a non-limiting illustration of a vertical sandwich mold configuration which can be used to form a metal-carbon nanostructure composite which includes one or more weighted tops or inserts in order to densify the composites is shown. In FIG. 5A, two or more vertically aligned arrays formed on metal substrates are placed in a mold and a second metal or metal alloy can optionally be added (not shown). As shown in FIG. 5B, following heating and the optional application of pressure a metal-carbon nanostructure composite is formed.

In certain embodiments, the sandwich or stack of one or more of the carbon nanostructure arrays, which are formed on a substrate or support may be the same or may differ from one another, such as for example, in the length or density of the CNTs, or in the type of conformal coating(s) applied, as needed.

Such molding or casting processes can take advantage of numerous types of molds. In some other embodiments, such processes allow for selective orientation of the carbon nanostructure array formed on a substrate or support in order to manipulate the flow of the molten metals with respect to the alignment of the CNTs. The mold can be modified to encompass designs that may be used for creating various types of bulk metal-carbon composites.

Such bulk composites can be formed into shapes which include, but are not limited, to rods or plates. In certain embodiments, the casting processes described can further include the placement of weighted pieces or articles on the top, bottom, or other plane of a mold, or these may inserted into the mold in order to exert control of a parameter, such as for densification of the composite, as shown in FIG. 5.

In certain embodiments, the methods described herein may be carried out in an inert non-reactive environment in order to prevent undesired chemical reaction(s).

IV. Uses of Metal-Carbon Nanostructure Composites

The metal-carbon nanostructure composites described herein can be used as feedstock materials which can be used in a continuous casting or melt extrusion process.

In certain embodiments, the metal-carbon nanostructure composites described herein can be added to a melt of a metal or metal alloy and cast and formed into sheets, plates, foils, rods, wires, strips, ingots, pellets, or chunks which can be subsequently added to another metal or metal alloy melt.

In certain embodiments, the metal-carbon nanostructure composites described herein, can be heated by itself or concurrently with pure metal or metal alloy above the melting temperature to form or cast a composite in a suitable form such as a sheet, plate, foil, rod, wire, strip, ingot, pellet, or chunk.

In one non-limiting example, it is possible to sandwich or stack one or more arrays of CNT on metal substrate and combine them with pure metal or metal alloy melt during heating. This process can take advantage of numerous types of molds and allows for control of orientations the arrays of CNT on metal substrate in order to manipulate the flow of the liquid molten metal or metal alloy with respect to the CNTs. The mold can be modified to encompass designs that may be used for creating various bulk composites. Examples of these bulk composites are but are not limited to CNT-metal rods and plates. Weighted pieces on top, bottom, or inserted in the mold.

In certain embodiments, the metal-carbon nanostructure composites described may be placed or affixed in between a heat source and a heat sink or heat spreader, such as between an integrated circuit package and a heat exchanger, to improve the transfer of heat from the heat source to the heat sink or spreader. In certain other embodiments, metal or metal alloys, which are prepared by mixing the composites into the respective melts of metal or metal alloys and can be used in the same manner In some embodiments, the metal-carbon nanostructure containing composites exhibit electrical conductivities, thermal conductivities, and mechanical properties which are distinct and improved from that of the pristine metal or metal alloy, which does not contain any carbon nanostructures dispersed therein.

In certain embodiments, the metal-carbon nanostructure containing composites described herein can be used as thermal interface materials (TIMs) in personal computers, server computers, memory modules, graphics chips, radar and radio-frequency (RF) devices, disc drives, displays, including light-emitting diode (LED) displays, lighting systems, automotive control units, power-electronics, solar cells, batteries, communications equipment, such as cellular phones, thermoelectric generators, and imaging equipment, including MRIs. In certain embodiments, the TIMs can operate at temperatures up to about 200° C.

In certain other embodiments, the metal-carbon nanostructure containing composites can alternatively be used for applications other than heat transfer. Examples include, but are not limited to, microelectronics, through-wafer vertical interconnect assemblies, and electrodes for batteries and capacitors. Currently, copper and aluminum foil are used as the backing materials for the anode and cathode in lithium ion batteries.

In yet other embodiments, the metal-carbon nanostructure containing composites can also be used for electromagnetic shielding, wherein the CNTs can act to effectively absorb electromagnetic irradiation as well as solar absorbing mate- Preparation of Carbon Nanotube—Aluminum Metal Composites The vertically aligned CNT array, formed on one or both sides of an Al foil and conformally coated with a layer of $Al_2O_3$ having a thickness of 5 nm were added to molten aluminum metal. The composites were processed at temperatures ranging from the minimum melting temperature of the metal matrix 200° C. to up to 1200° C. The exposure time, once at the processing temperature, ranged from 30 seconds to 6 hours. Cooling was allowed to occur through exposure to air at atmospheric pressure.

Characterization of Carbon Nanotube—Aluminum Metal Composites

The aluminum-carbon nanotube composite (denoted CNT-Al) formed as described herein was characterized and compared to pristine Aluminum metal as detailed in Table 1 below. All samples were tested at 295

TABLE 1

| Sample | Density ($g/cm^3$) | Specific Conductivity (S/mP) | Voltage (V) | Current (A) Fixed | Resistivity ($\Omega$) | Conductivity (S/m) | Thermal Conductivity (W/m · K) |
|---|---|---|---|---|---|---|---|
| Pristine Aluminum | 0.0278 | 1.00E+09 | 1.58E−04 | 1.00E+00 | 3.58E−08 | 2.79E+07 | 2.01E+02 |
| CNT-Al | 0.0215 | 1.41E+09 | 4.95E−05 | 1.00E+00 | 3.30E−08 | 3.03E+07 | 2.18E+02 | rial, to enhance solar absorption in solar hot water heaters. In other embodiments, the composites described can be used in applications including, but not limited to, armored reinforcements, forming structural frames, cast or extruded to form molded heat sinks and heat spreaders, such as for mobile electronics, aerospace and automotive brakes, gears and frames. In some embodiments, the metal-carbon nanostructure composite can be placed at an interface between a heat sink and a chip (such as an electronic or computer chip) and the composite has a thermal resistance of less than 1 $mm^2K/W$.

EXAMPLES

Example 1

Preparation of Vertically Aligned Carbon Nanotube Arrays on Aluminum Substrate

Vertically aligned forests of carbon nanotubes (CNTs) were grown on one or both sides of 50 μm thick Al foil (Goodfellow) using a low-pressure chemical vapor deposition process at 635° C. and 440 mbar in tube furnace connected to a mass flow controller that feeds argon, hydrogen, and $CH_2H_2$ as the carbon source gas. The growth time was varied from 3-5 min to grow forests of multiwalled CNTs ranging from 8-100 μm in height with an average CNT diameter of 10 nm.

Coating of Carbon Nanotube Arrays

The CNTs forming the vertically aligned array of carbon nanotubes (CNTs) grown on one or both sides of the Al foil were conformally coated via atomic layer deposition (ALD) with a layer of $Al_2O_3$ having a thickness of 2-10 nm.

Figure 6:
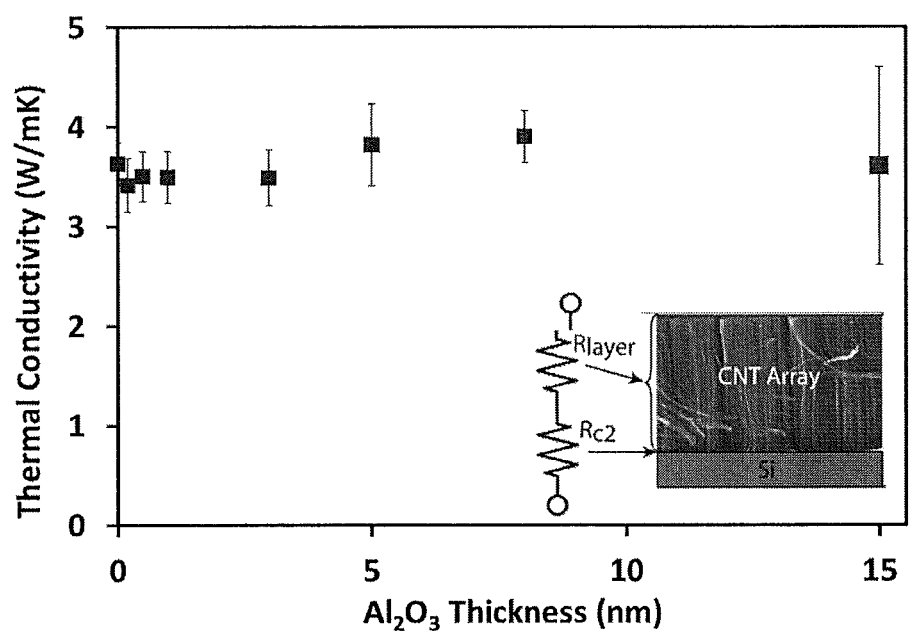
FIG. 6 is a graph of an $Al_2O_3$ coated vertically aligned CNT layer showing the thermal conductivity (W/m·K) on the y-axis as a function of the thickness (nm) on the x-axis of the $Al_2O_3$ coating on the CNTs.

As shown in FIG. 6, $Al_2O_3$ coated vertically aligned CNT layer showed thermal conductivities (W/m·K) which did not change significantly as a function of the thickness of the $Al_2O_3$ coating on the CNTs. This demonstrated the ability to add the coatings without degrading thermal transport properties of the CNTs.

Correction factors were used to properly calculate the conductivity and resistivity of the pristine aluminum and Al-CNT composites. The correction factors are specific for collinear probes or in-line probes with equal probe spacing (Schroder, D. (1990). Resistivity. In Semiconductor material and device characterization ($2^{nd}$ Ed., pp. 8-9). New York, N.Y.: Wiley.)

The samples were measured using the 4 point probe method on an insulated bottom barrier and the thickness t was greater than half of the probe spacing s (t≥s/2). Therefore, the designated correction factor used was:

$$\rho = \frac{\pi t}{\ln(2)} \frac{V}{I} = 4.532 \frac{V}{I}$$

The specific conductivity was calculated by dividing the measured conductivity by the density of the material.

Scanning electron microscopy imaging was performed (not shown) on the composite prepared which revealed protruding elements sticking out of the Al-CNT matrix. Without wishing to be bound by any theory, it is believed these elements may be coated agglomerated CNT cluster(s). Imaging of the surface of the composite (not shown) further revealed vain like structures. Such surface irregularities in the Al-CNT matrix suggested the presence of CNTs closer to the surface of the composite. Finally, imaging of a fracture surface of the Al-CNT composite (not shown) also revealed irregularities in the fracture surface and a protruding mass, which goes back into the matrix and does not follow the directional pattern of its surroundings, indicative of CNTs within the matrix.

We claim:
1. A metal-carbon composite comprising:
   a plurality of conformally coated carbon nanotubes having lengths in the range of 1-1000 microns which are uniformly dispersed within a metal or metal alloy matrix;

wherein the plurality of carbon nanotubes dispersed within the metal or metal alloy matrix have a controlled alignment along the in-plane direction, cross-plane direction, or along an intermediate-plane direction;

wherein the conformal coating on the plurality of coated carbon nanotubes has a thickness between 1 and 250 nm;

wherein the conformal coating comprises a metal, carbonaceous material, or polymeric material, which increases the wettability and dispersibility of the carbon nanotubes in the metal or metal alloy forming the metal or metal alloy matrix; and wherein the metal is selected from aluminum, chromium, zinc, tantalum, platinum, gold, tin, lead, silver, titanium, indium, copper, metal oxides thereof, and combinations thereof; and wherein the metal-carbon composite is in an interface between a heat sink or heat spreader and a heat source and the metal-carbon composite has a thermal resistance of less than 5 mm²K/W.

2. The metal-carbon composite of claim 1, wherein the conformal coating comprises the metal of claim 1 or metal oxide thereof.

3. The metal-carbon composite of claim 2, wherein the metal oxide is selected from metal oxides of aluminum, cobalt, chromium, zinc, tantalum, platinum, gold, nickel, iron, tin, lead, silver, titanium, indium, copper, and combinations thereof.

4. The metal-carbon composite of claim 1, wherein the carbonaceous material is selected from pyrolytic carbon, graphite, single-layered graphene, and multi-layered graphene.

5. The metal-carbon composite of claim 1, wherein the polymeric material is selected from conjugated polymers and aromatic polymers.

6. The metal-carbon composite of claim 1, wherein the metal or metal alloy matrix comprises a metal selected from the group consisting of aluminum, copper, cobalt, chromium, zinc, tantalum, platinum, gold, nickel, iron, tin, lead, silver, titanium, indium, and combinations thereof.

7. The metal-carbon composite of claim 1, wherein the conformal coating material is associated to the surface of the carbon nanotubes through van der Waals bonds, π-π stacking, and/or covalent bonds.

8. The metal-carbon composite of claim 1, further comprising a plurality of metallic particles on the surface of the conformally coated carbon nanotubes.

9. The metal-carbon composite of claim 8, wherein the metallic particles are selected from the group consisting of palladium nanoparticles, gold nanoparticles, silver nanoparticles, titanium nanoparticles, iron nanoparticles, nickel nanoparticles, copper nanoparticles, and combinations thereof.

10. The metal-carbon composite of claim 1, wherein the composite has an electrical conductivity which is at least about 105%, 110%, 115%, 120%, 125%, 130%, 135%, 140%, 145%, 150% higher than that of an electrical conductivity of a metal or metal alloy matrix which does not contain any dispersed carbon nanotubes.

11. The metal-carbon composite of claim 1, wherein the composite has a thermal conductivity which is at least about 20, 30, 50, or 70% greater than that of a thermal conductivity for metal or metal alloy matrix which does not contain any dispersed carbon nanotubes.

12. The metal-carbon composite of claim 1, wherein the composite has a coefficient of thermal expansion which is at least about 50, 40, 30, 20, or 10% of a coefficient of thermal expansion for an equivalent pristine metal or metal alloy matrix.

13. The metal-carbon composite of claim 1, wherein the composite is in an interface between the heat sink or the heat spreader and the heat source is a chip and the composite has a thermal resistance of less than 1 mm² K/W.

14. The metal-carbon composite of claim 1, wherein the composite is in the form of a sheet, plate, foil, rod, wire, strip, ingot, pellet, or chunk.

15. The metal-carbon composite of claim 1, wherein the conformal coating has a thickness between 5 and 100 nm.

16. The metal-carbon composite of claim 1, wherein the conformal coating has a thickness between 5 and 50 nm.

17. The metal-carbon composite of claim 1, wherein the thermal resistance is less than 1 mm² K/W.

18. The metal-carbon composite of claim 1, wherein the heat source is a personal computer, server computer, memory module, graphics chip, radar, radio-frequency (RF) device, disc drive, display, light-emitting diode (LED) displays, lighting system, automotive control unit, power-electronic, solar cell, battery, communication equipment, thermoelectric generator, or imaging equipment.

19. A method of making the metal-carbon composite of claim 1, the method comprising the steps of:
1) preparing a carbon nanotube array on a substrate, wherein the carbon nanotube array comprises a plurality of carbon nanotubes;
2) conformally coating the plurality of carbon nanotubes on the substrate with one or more coating materials in an amount effective to increase the wettability and dispersibility of the plurality of carbon nanotubes in a metal or metal alloy matrix; wherein the conformal coating on the plurality of carbon nanotubes has a thickness between 1 and 250 nm; the one or more coating materials comprise a metal, carbonaceous material, or polymeric material; and the metal is selected from aluminum, chromium, zinc, tantalum, platinum, gold, tin, lead, silver, titanium, indium, copper, metal oxides thereof, and combinations thereof;
3) adding the conformally coated carbon nanotubes on the substrate to a melt of a metal or metal alloy matrix to form a mixture; and
4) cooling the mixture in order to form a metal-carbon nanotube composite wherein the plurality of the carbon nanotubes are uniformly dispersed within the metal or metal alloy matrix; and wherein the plurality of carbon nanotubes dispersed within the metal or metal alloy matrix have a controlled alignment along the in-plane direction, cross-plane direction, or along an intermediate-plane direction; and
wherein the metal-carbon composite, when present at the interface between a heat sink or heat spreader and a heat source, the metal-carbon composite has a thermal resistance of less than 5 mm² K/W.

20. The method of claim 19, wherein the substrate is a foil comprising a metal or metal alloy.

21. The method of claim 19, wherein the carbon nanotube array is formed on one or both sides of the substrate.

22. The method of claim 19, wherein the melt of metal or metal alloy matrix comprises a metal selected from the group consisting of aluminum, copper, cobalt, chromium, zinc, tantalum, platinum, gold, nickel, iron, tin, lead, silver, titanium, indium, and combinations thereof.

23. The method of claim 19, wherein the substrate is formed of a metal which is different from the metal used to form the metal or metal alloy matrix melt.

24. The method of claim 19, wherein the substrate melts at a higher temperature than the temperature of the melt of the metal or metal alloy melt in order to keep the substrate intact and the array of carbon nanotubes in their original orientation after the melt of the metal or metal alloy matrix infiltrates the array.

25. The method of claim 19, further comprising a step of mechanical mixing or agitation of the mixture in order to control or improve the uniformity of the carbon nanotubes dispersed throughout the composite.

26. The method of claim 19, further comprising a step of casting the mixture in a mold to form a sheet, plate, foil, rod, strip, ingot, pellet, or chunk after the step of cooling.

27. The method of claim 26, wherein the casting of the mixture in the mold further comprises applying pressure or weights to the mold.

28. The method of claim 19, wherein the conformal coating comprises the metal of claim 16 or metal oxide thereof.

29. The method of claim 19, wherein the metal oxide is selected from metal oxides of aluminum, cobalt, chromium, zinc, tantalum, platinum, gold, nickel, iron, tin, lead, silver, titanium, indium, copper, and combinations thereof.

30. The method of claim 19, wherein the carbonaceous material is selected from pyrolytic carbon, graphite, single-layered graphene, and multi-layered graphene.

31. The method of claim 19, wherein the polymeric material is selected from conjugated polymers or aromatic polymers.

\* \* \* \* \*